US010510263B2

(12) United States Patent
Cacioppo et al.

(10) Patent No.: US 10,510,263 B2
(45) Date of Patent: Dec. 17, 2019

(54) DYNAMICALLY CONFIGURABLE AUDIENCE RESPONSE SYSTEM

(75) Inventors: Christopher M. Cacioppo, Somerville, MA (US); Brian Prendergast, Arlington, MA (US); Manuel Perez, Somerville, MA (US); David J. Dean, Cambridge, MA (US)

(73) Assignee: Boxlight Corporation, Lawrenceville, GA (US)

( * ) Notice: Subject to any disclaimer, the term of this patent is extended or adjusted under 35 U.S.C. 154(b) by 1246 days.

(21) Appl. No.: 13/574,060

(22) PCT Filed: Jan. 19, 2011

(86) PCT No.: PCT/US2011/021640
§ 371 (c)(1),
(2), (4) Date: Aug. 2, 2012

(87) PCT Pub. No.: WO2011/090976
PCT Pub. Date: Jul. 28, 2011

(65) Prior Publication Data
US 2012/0295644 A1  Nov. 22, 2012

Related U.S. Application Data

(60) Provisional application No. 61/296,782, filed on Jan. 20, 2010.

(51) Int. Cl.
*G09B 5/08*  (2006.01)
*G09B 7/02*  (2006.01)
(Continued)

(52) U.S. Cl.
CPC .................. *G09B 5/08* (2013.01); *G09B 7/02* (2013.01); *H04M 1/72502* (2013.01); *H04W 8/245* (2013.01)

(58) Field of Classification Search
CPC ....... G09B 5/08; G09B 7/02; H04M 1/72502; H04W 8/245
(Continued)

(56) References Cited

U.S. PATENT DOCUMENTS 4,876,592 A  10/1989  Von Kohorn
4,926,255 A   5/1990  Von Kohorn
(Continued)

FOREIGN PATENT DOCUMENTS

EP  402809 A2  12/1990
EP  526979 A2   2/1993
(Continued)

OTHER PUBLICATIONS

International Search Report and Written Opinion for corresponding International Application No. PCT/US2011/021640, dated May 2, 2011.
(Continued)

*Primary Examiner* — Shahriar Behnamian
(74) *Attorney, Agent, or Firm* — K&L Gates LLP

(57) ABSTRACT

A dynamically configurable audience response system includes multiple handsets communicatively coupled to a wireless aggregation point. Each handset includes at least one dynamically configurable operating parameter, such as a handset ID that identifies that handset, one or more parameters defining a communication channel that the handset can use to communicate with the wireless aggregation point, and/or one or more parameters defining various keys that the handset can use to establish a communication link with the wireless aggregation point. In some embodiments, the operating parameters associated with the handsets may be defined dynamically via the wireless aggregation point and without any user interaction with the handset. Additionally, or alternatively, in some embodiments, in order to
(Continued)

define, or redefine, the operating parameters associated with the handsets, the dynamically configurable audience response system may include a handset configuration station, via which the operating parameters of the handsets may be defined.

17 Claims, 10 Drawing Sheets

(51) Int. Cl.
  *H04W 8/24* (2009.01)
  *H04M 1/725* (2006.01)
(58) Field of Classification Search
  USPC .................................................. 455/464, 518
  See application file for complete search history.

(56) References Cited

U.S. PATENT DOCUMENTS

| | | | |
|---|---|---|---|
| 5,034,807 A | 7/1991 | Von Kohorn | |
| 5,273,437 A | 12/1993 | Caldwell et al. | |
| 5,283,734 A | 2/1994 | Von Kohorn | |
| 5,313,655 A | 5/1994 | Sasuta | |
| 5,388,101 A | 2/1995 | Dinkins | |
| 5,465,384 A | 11/1995 | Bejan et al. | |
| 5,481,546 A | 1/1996 | Dinkins | |
| 5,633,872 A | 5/1997 | Dinkins | |
| 5,678,172 A | 10/1997 | Dinkins | |
| 5,697,844 A | 12/1997 | Von Kohorn | |
| 5,724,357 A | 3/1998 | Derks | |
| 5,737,363 A | 4/1998 | Dinkins | |
| 5,759,101 A | 6/1998 | Von Kohorn | |
| 5,790,936 A | 8/1998 | Dinkins | |
| 5,854,793 A | 12/1998 | Dinkins | |
| 5,860,023 A | 1/1999 | Tognazzini | |
| 5,916,024 A | 6/1999 | Von Kohorn | |
| 5,978,569 A | 11/1999 | Traeger | |
| 6,021,119 A | 2/2000 | Derks et al. | |
| 6,434,398 B1 | 8/2002 | Inselberg | |
| 6,443,840 B2 | 9/2002 | Von Kohorn | |
| 6,760,595 B2 | 7/2004 | Inselberg | |
| 6,996,413 B2 | 2/2006 | Inselberg | |
| 7,248,888 B2 | 7/2007 | Inselberg | |
| 7,263,378 B2 | 8/2007 | Inselberg | |
| 7,277,671 B2 | 10/2007 | Glass et al. | |
| 7,300,716 B2 | 11/2007 | Saliger et al. | |
| 7,433,348 B1 | 10/2008 | Bordui et al. | |
| 7,881,737 B2* | 2/2011 | Klein | 455/518 |
| 8,254,942 B2* | 8/2012 | McBeath | H04W 72/04 370/319 |
| 2001/0003099 A1 | 6/2001 | Von Kohorn | |
| 2002/0029381 A1 | 3/2002 | Inselberg | |
| 2003/0003990 A1 | 1/2003 | Von Kohorn | |
| 2003/0144017 A1 | 7/2003 | Inselberg | |
| 2003/0153263 A1 | 8/2003 | Glass et al. | |
| 2003/0153321 A1 | 8/2003 | Glass et al. | |
| 2003/0153347 A1 | 8/2003 | Glass et al. | |
| 2003/0211856 A1 | 11/2003 | Zilliacus | |
| 2004/0033478 A1* | 2/2004 | Knowles et al. | 434/350 |
| 2004/0171381 A1 | 9/2004 | Inselberg | |
| 2004/0229642 A1 | 11/2004 | Derks et al. | |
| 2005/0032543 A1 | 2/2005 | Adkins | |
| 2005/0078660 A1 | 4/2005 | Wood | |
| 2006/0068818 A1 | 3/2006 | Leitersdorf et al. | |
| 2006/0072497 A1 | 4/2006 | Buehler et al. | |
| 2006/0094409 A1 | 5/2006 | Inselberg | |
| 2006/0154657 A1 | 7/2006 | Inselberg | |
| 2006/0199597 A1 | 9/2006 | Wright | |
| 2006/0218572 A1 | 9/2006 | Thielman et al. | |
| 2007/0011040 A1 | 1/2007 | Wright et al. | |
| 2007/0015464 A1 | 1/2007 | Disalvo | |
| 2007/0015531 A1 | 1/2007 | Disalvo | |
| 2007/0022032 A1 | 1/2007 | Anderson et al. | |
| 2007/0064902 A1 | 3/2007 | Glass et al. | |
| 2007/0087791 A1 | 4/2007 | Feeney et al. | |
| 2007/0093260 A1 | 4/2007 | Billing et al. | |
| 2007/0124789 A1 | 5/2007 | Sachson et al. | |
| 2007/0140257 A1 | 6/2007 | Lee et al. | |
| 2007/0153888 A1 | 7/2007 | Kim et al. | |
| 2007/0153933 A1 | 7/2007 | Lee et al. | |
| 2007/0172003 A1 | 7/2007 | Kim et al. | |
| 2007/0180350 A1 | 8/2007 | Choi et al. | |
| 2007/0186137 A1 | 8/2007 | Choi et al. | |
| 2007/0195889 A1 | 8/2007 | Hong et al. | |
| 2007/0197247 A1 | 8/2007 | Inselberg | |
| 2007/0201516 A1 | 8/2007 | Lee et al. | |
| 2007/0202900 A1 | 8/2007 | Inselberg | |
| 2008/0046910 A1 | 2/2008 | Schultz et al. | |
| 2008/0058027 A1* | 3/2008 | Klein | 455/573 |
| 2008/0059988 A1 | 3/2008 | Lee et al. | |
| 2008/0061934 A1 | 3/2008 | Setlow et al. | |
| 2008/0098417 A1 | 4/2008 | Hatamian et al. | |
| 2008/0101454 A1 | 5/2008 | Luff et al. | |
| 2008/0108298 A1 | 5/2008 | Selen et al. | |
| 2008/0125146 A1 | 5/2008 | Bainbridge | |
| 2008/0215476 A1 | 9/2008 | Rabenold et al. | |
| 2008/0250441 A1 | 10/2008 | Sharma et al. | |
| 2008/0276264 A1 | 11/2008 | Selen et al. | |
| 2008/0311943 A1 | 12/2008 | Earl | |
| 2008/0316953 A1 | 12/2008 | Buehler et al. | |
| 2009/0040183 A1 | 2/2009 | Buehler et al. | |
| 2009/0116414 A1 | 5/2009 | Or et al. | |
| 2010/0130253 A1* | 5/2010 | Troster | G06F 8/656 455/557 |

FOREIGN PATENT DOCUMENTS

| | | |
|---|---|---|
| EP | 697773 A2 | 2/1996 |
| EP | 917333 A1 | 5/1999 |
| GB | 2437787 A | 11/2007 |
| JP | 5344084 A | 12/1993 |
| JP | 7023356 A | 1/1995 |
| JP | 2003087760 A | 3/2003 |
| WO | WO-94/13105 A1 | 6/1994 |
| WO | WO-00/70783 A1 | 11/2000 |
| WO | WO-2004/079535 A2 | 9/2004 |
| WO | WO-2005/003994 A1 | 1/2005 |
| WO | WO-2007/070675 A2 | 6/2007 |
| WO | WO-2007/070789 A2 | 6/2007 |
| WO | WO-2007/092129 A2 | 8/2007 |
| WO | WO-2008/027690 A2 | 3/2008 |
| WO | WO-2011/066517 | 6/2011 |

OTHER PUBLICATIONS

English Translation of Chinese First Office Action Issued by State Intellectual Property Office for Application No. 201180006804.7, dated Jun. 26, 2014.

* cited by examiner

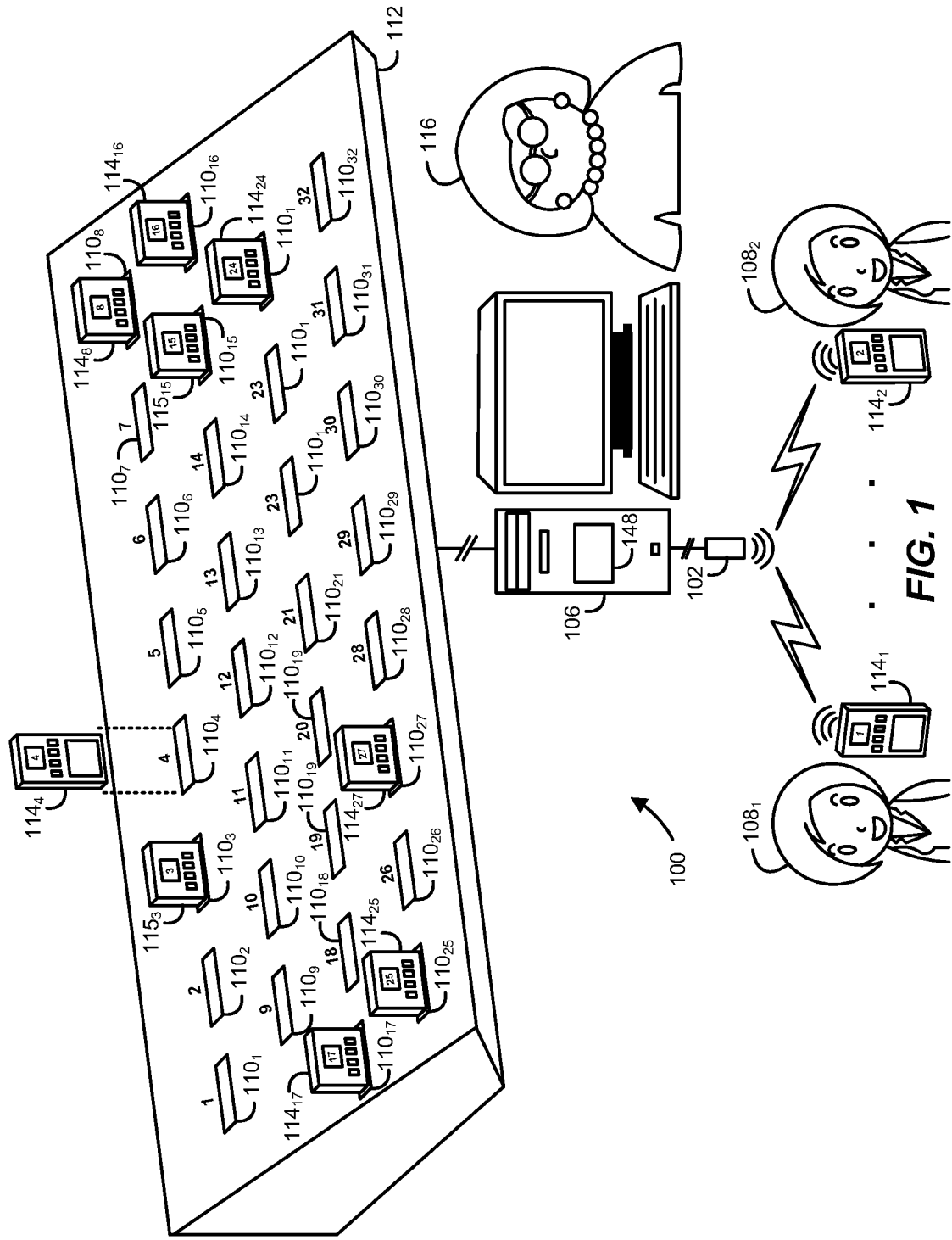

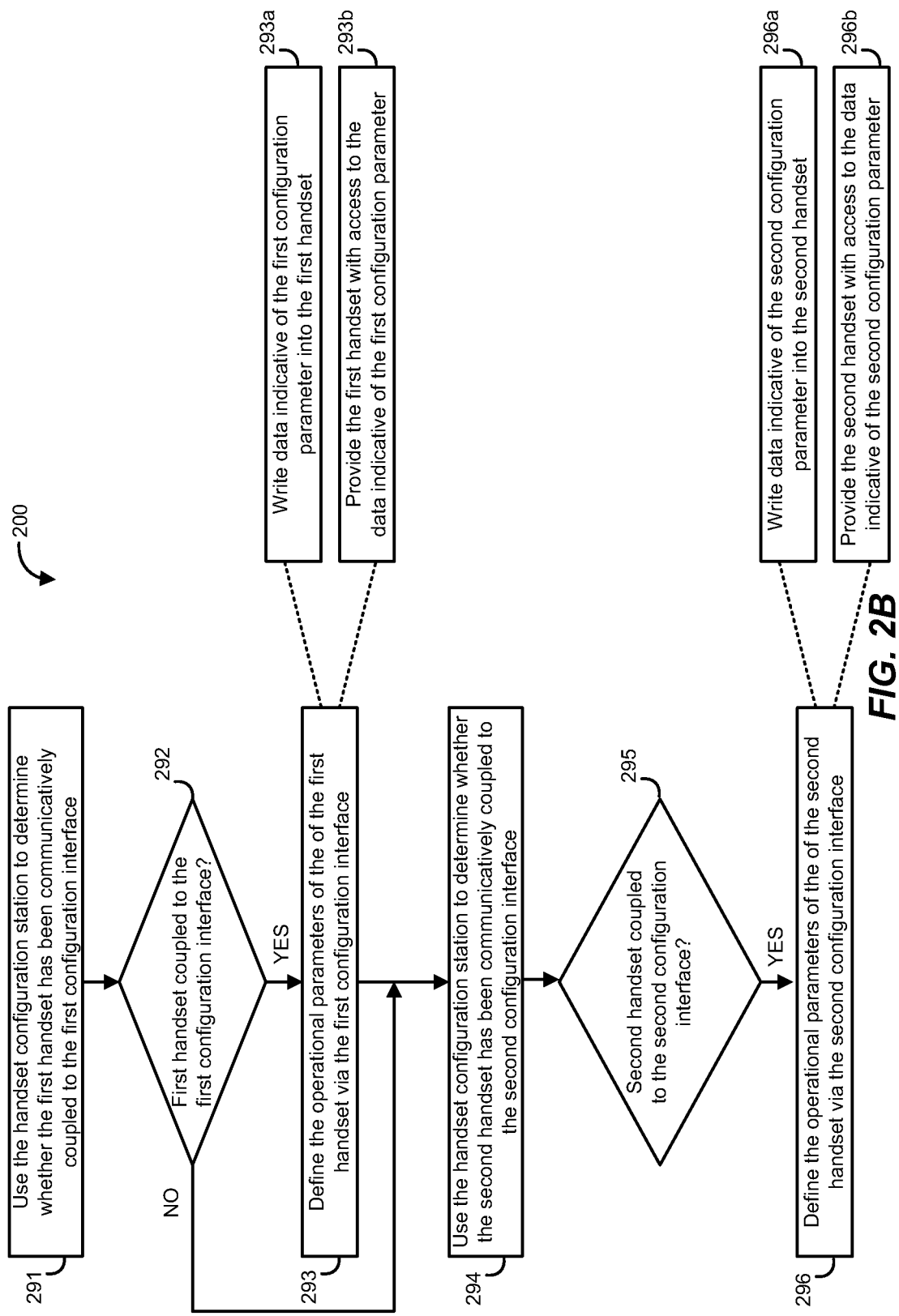

DYNAMICALLY CONFIGURABLE AUDIENCE RESPONSE SYSTEM

REFERENCE TO RELATED APPLICATIONS

This is the US National Phase under 35 USC § 371 of International Patent Application No. PCT/US2011/21640, filed Jan. 19, 2011, which claims priority benefit of U.S. Provisional Application No. 61/296,782, filed Jan. 20, 2010. The entire specification of U.S. Provisional Application No. 61/296,782 is incorporated herein by reference.

FIELD OF DISCLOSURE

The present disclosure relates generally to communication systems and, more particularly, to a dynamically configurable audience response system.

BACKGROUND

The background description provided herein is for the purpose of generally presenting the context of the disclosure. Work of the presently named inventors, to the extent it is described in this background section, as well as aspects of the description that may not otherwise quality as prior art at the time of filing, are neither expressly nor impliedly admitted as prior art against the present disclosure.

Audience response systems (ARS), in which group members use handsets to vote on topics, answer questions, confirm attendance, etc., are commonly used today to facilitate group interaction. Audience response systems can be employed for a variety of purposes and in various types of group environments. As one example, audience response systems are used by teachers in a classroom setting (e.g., to take attendance, or to administer tests and quizzes), and research indicates that there are various benefits to using audience response systems in such a setting. For instance, audience response systems reduce the effect of crowd psychology because, unlike hand raising, audience response systems may prevent students from seeing the answers of other students. For similar reasons, audience response systems may reduce instances of cheating in the classroom. Furthermore, audience response systems typically allow faster tabulation and display of answers and a more efficient tracking of individual responses and other data (e.g., response times of individual students). Additionally, audience response systems in classrooms have been shown to improve attentiveness, increase knowledge retention and generally create a more enjoyable classroom environment and a more positive learning experience.

In a typical audience response system architecture, multiple handsets associated with different users communicate wirelessly, e.g., using radio frequency or infrared communication technology, with one or more wireless aggregation points that generally collect and, possibly, process the data communicated by the audience via the handsets. A wireless aggregation point is typically (but not always) communicatively coupled to a control station, such as a personal computer, that runs a program that generally controls the operation of the audience response system. That is, the control station may be used to process information received from the handsets and to determine what information is sent to the handsets.

In order for an audience response system to function properly and effectively, the handsets typically need to be configured (and sometimes reconfigured dynamically) to operate together in an efficient manner, and without interfering with one another. Generally, configuring a handset involves defining (or providing a value for) one or more operating parameters associated with the handset. Operating parameters associated with a given handset may include, a unique (or a quasi-unique) handset identifier (ID) that identifies that handset, one or more parameters defining a communication channel (e.g., a particular frequency or a frequency band used for communication) that the handset can use to communicate with the wireless aggregation point, one or more parameters defining various keys that the handset can use to establish a communication link with the wireless aggregation point (e.g., synchronization keys, an encryption keys, access keys), and so on.

Operating parameters of handsets are typically defined, at least in part, manually (e.g., by a teacher), and defining and redefining these operating parameters can be a burdensome task. For example, operating parameters typically need to defined for each handset in the audience response system before the handsets can be used, so that, for example, no two handsets have the same handset ID, or share a communication channel in a conflicting manner. Additionally, because of the dynamic nature of many audience response systems, and/or environments in which they operate (i.e., handsets and/or wireless access points are periodically replaced, new ones are added, new communication channels, encryption keys are introduced, user preferences change), operating parameters of a handset may need to be redefined dynamically in response to changes in the audience response system. For example, when a given handset has its handset ID set to a particular value, if another handset has its handset ID set to the same value, the two handsets (or at least one of them) may need to be reconfigured so that the two handsets have different handset IDs.

As a result, teachers may end up spending significant time configuring and reconfiguring handsets, or even just verifying that the configuration of each handset is proper. This may render the audience response system prohibitively inefficient and its use unjustified.

SUMMARY

The present disclosure provides several embodiments of a dynamically configurable audience response system that has the capability to configure and reconfigure itself automatically and dynamically with limited user involvement.

The dynamically configurable audience response system includes multiple handsets that may be used by students to answer questions, vote on a topic, confirm attendance, and so on. Generally, the handsets may be configured to receive user input data (such as answers to a multiple-choice questions) from students and to communicate the user input data to one or more wireless aggregation points. A wireless aggregation point may be coupled to a control station, and the control station, the wireless aggregation point, or a combination thereof may be used to process the user input data.

The handsets include at least one dynamically configurable operating parameter, such as a handset ID that identifies that handset, one or more parameters defining a communication channel that the handset can use to communicate with the wireless aggregation point, and/or one or more parameters defining various keys that the handset can use to establish a communication link with the wireless aggregation point. In some embodiments, the operating parameters associated with the handsets may be defined dynamically via the wireless aggregation point and without any user interaction with the handset. Additionally, or alternatively, in some embodiments, in order to define, or redefine, the operating parameters associated with the handsets, the dynamically configurable audience response system may include a handset configuration station, via which the operating parameters of the handsets may be defined.

Generally, the handset configuration station includes multiple configuration interfaces, and each configuration interface may have one or more associated configuration parameters corresponding to the operating parameters associated with the handsets. Handsets can be communicatively coupled to the configurations interfaces, and the operating parameters associated with the handsets may be defined via the configuration interfaces based on the configuration parameters associated with the configuration interfaces. In some embodiments, the handset configuration station can be a docking station, where the configurations interfaces are configuration slots into which handsets can be docked (e.g., inserted, or plugged in) to be configured.

In one embodiment, an audience response system includes a wireless aggregation point, a first handset configured to communicatively couple to the wireless aggregation point and a second handset configured to communicatively couple to the wireless aggregation point. The first handset is configured to receive a first user input from a first user and to communicate the first user input to the wireless aggregation point and the second handset is configured to receive a second user input from a second user and to communicate the second user input to the wireless aggregation point. The audience response system further includes a handset configuration station. The handset configuration station includes a first configuration interface and a second configuration interfaces. The first handset is configured to communicatively couple to the first configuration interface to define an operating parameter of the first handset via the first configuration interface. The second handset is configured to communicatively couple to the second configuration interface to define an operating parameter of the second handset via the second configuration interface.

In another embodiment, a handset configuration station may be used with an audience response system that includes a wireless aggregation point, a first handset configured to communicatively couple to the wireless aggregation point and a second handset configured to communicatively couple to the wireless aggregation point. The first handset is configured to receive a first user input from a first user and to communicate the first user input to the wireless aggregation point and the second handset is configured to receive a second user input from a second user and to communicate the second user input to the wireless aggregation point. The handset configuration station includes a first configuration interface and a second configuration interfaces. The first handset is configured to communicatively couple to the first configuration interface to define an operating parameter of the first handset via the first configuration interface. The second handset is configured to communicatively couple to the second configuration interface to define an operating parameter of the second handset via the second configuration interface.

In another embodiment a method for configuring an audience response system is provided. The audience response system includes a wireless aggregation point, a first handset configured to communicatively couple to the wireless aggregation point and a second handset configured to communicatively couple to the wireless aggregation point. The first handset is configured to receive a first user input from a first user and to communicate the first user input to the wireless aggregation point and the second handset is configured to receive a second user input from a second user and to communicate the second user input to the wireless aggregation point. The method includes determining that the first handset has been communicatively coupled to the first configuration interface. The method further includes determining that the second handset has been communicatively coupled to the first configuration interface. The method further includes defining an operating parameter of the first handset via the first configuration interface. The method further includes defining an operating parameter of the second handset via the second configuration interface.

In another embodiment, a handset for use in an audience response system includes a user interface configured to receive user input from a user and to communicate data indicative of the user input to a wireless aggregation point. The handset further includes an operating parameter storage unit configured to store a value of a handset identifier (ID), where the value of the handset ID identifies the handset. The handset further includes an operating parameter configuration unit configured to receive, via the wireless aggregation point, updated ID data, and to update the value of the handset ID stored in the operating parameter storage unit based on the received updated ID data. The received updated ID data is indicative of an updated value of the handset ID and/or an updated value of a peer handset ID. The updated value of the peer handset ID identifies another handset in the audience response system.

In another embodiment, an audience response system includes a wireless aggregation point, a first handset, and a second handset. The first handset includes a user interface configured to receive user input from a user and to communicate data indicative of the user input to the wireless aggregation point. The first handset further includes an operating parameter storage unit configured to store a value of a first handset identifier (ID), where the value of the first handset ID identifies the first handset. The first handset further includes an operating parameter configuration unit configured to receive, via the wireless aggregation point, updated ID data, and to update the value of the first handset ID stored in the operating parameter storage unit based on the received updated ID data. The received updated ID data is indicative of an updated value of the first handset ID and/or an updated value the second handset ID.

In another embodiment, a method of configuring a handset in an audience response system is provided. The handset has a processor and a memory, and the memory includes instructions that are executable on the processor. The method includes using the processor to store a value of a handset identifier (ID) that identifies the handset in the audience response system. The method further includes using the processor to receive, via a wireless aggregation point, updated ID data. The updated ID data is indicative of an updated value of the handset ID and/or an updated value of a peer handset ID that identifies another handset in the audience response system. The method further includes using the processor to update the stored value of the handset ID based on the received updated ID data.

In another embodiment, a handset may be used in an audience response system that includes a multiple handsets configured to communicatively couple to a wireless aggregation point, where the handset is one of the multiple handsets. The handset includes an operating parameter storage unit configured to store a value of an operating parameter of the handset. The value of the operating parameter of the handset is dynamically configurable without user interaction with the handset. The handset further includes a user interface configured to receive user input and to communicate data indicative of the user input to the wireless aggregation point and to provide, via the handset, an electronic indication of the operating parameter of the handset.

In another embodiment, an audience response system includes a wireless aggregation point and multiple handsets communicatively coupled to the wireless aggregation point. One of the multiple handsets includes an operating parameter storage unit configured to store a value of an operating parameter of the handset. The value of the operating parameter of the handset is dynamically configurable without user interaction with the handset. The handset further includes a user interface configured to receive user input and to communicate data indicative of the user input to the wireless aggregation point. The handset is further configured to provide an electronic indication of the operating parameter of the handset.

In another embodiment, a method of configuring a user interface of one of multiple handsets in an audience response system is provided, where the multiple handsets are communicatively coupled to a wireless aggregation point. The method includes storing a value of an operating parameter of the handset. The value of the operating parameter of the handset is dynamically configurable without user interaction with the handset. The method further includes providing an electronic indication of the operating parameter of the handset via the user interface of the handset.

In another embodiment, a method is provided for use in a computing system configured to operate with an audience response system. The audience response system has a first handset storing therein a first handset identifier (ID) that identifies the first handset and a second handset storing therein a second handset (ID) that identifies the first handset. The first handset and the second handset are communicatively coupled to a wireless aggregation point. The computing system has a processor and a memory. The memory includes instructions that are executable on the processor. The method includes using the processor to receive information indicative of a current value of the first handset ID. The method further includes, subsequently, using the processor to receive information indicative of a current value of the second handset ID, where the current value of the first handset ID is the same as the current value of the first ID. The method further includes, subsequently, using the processor to store, in the memory, data indicative of an association between the current value of the second handset ID and the second handset. The method further includes, subsequently, using the processor to receive information indicative of a new value of the second handset ID, where the new value of the second handset ID is different from current value of the second handset ID. The method further includes, subsequently, using the processor to store, in the memory, data indicative of an association between the current value of the first handset ID and the first handset.

In another embodiment, a method is provided for use in a computing system configured to operate with an audience response system. The audience response system has a first handset storing therein a first handset identifier (ID) that identifies the first handset and a second handset storing therein a second handset (ID) that identifies the first handset. The first handset and the second handset are communicatively coupled to a wireless aggregation point. The computing system has a processor and a memory. The memory includes instructions that are executable on the processor. The method includes using the processor to receive information indicative of a current value of the first handset ID. The method further includes using the processor to receive information indicative of a current value of the second handset ID, where the current value of the second handset ID is the same as the current value of the first handset ID. The method further includes using the processor to transmit, via the wireless aggregation point, updated ID data to the first handset. The updated ID data is indicative of an association between the current value of the second handset ID and the second handset and/or an association between a new value of the first handset ID and the first handset. The updated ID data causes the first handset to change the stored first handset ID based on the updated ID data.

In another embodiment, a computer program product is configured to operate with an audience response system. The audience response system includes a first handset storing therein a first handset identifier (ID) associated with the first handset and a second handset storing therein a second handset ID associated with the second handset. The first handset and the second handset are communicatively coupled to a wireless aggregation point. The computer program product has a processor and a memory. The memory includes instructions executable on the processor to receive information indicative of a current value of the first handset ID. The memory further includes instructions executable on the processor to receive information indicative of a current value of the second handset ID, where the current value of the second handset ID is the same as the current value of the first handset ID. The memory further includes instructions executable on the processor to transmit, via the wireless aggregation point, updated ID data to the first handset. The updated ID data is indicative of an association between the current value of the second handset ID and the second handset and/or an association between a new value of the first handset ID and the first handset. The updated ID data causes the first handset to change the stored first handset ID based on the updated ID data.

BRIEF DESCRIPTION OF THE DRAWINGS

FIG. 1 is a block diagram illustrating an example audience response system that may be configured dynamically;

FIG. 2B is a flowchart illustrating an example method for configuring an audience response system using a handset configuration station;

Like reference numbers and designations in the various drawings indicate like elements. Furthermore, when individual elements are designated by references numbers in the form $N_M$, these elements may be referred to collectively by N. For example, FIG. 1 illustrates handsets $114_1$, $114_2, \ldots, 114_{32}$, and two or more of such handsets may be referred to collectively as handsets 114.

DETAILED DESCRIPTION

Figure 2A:
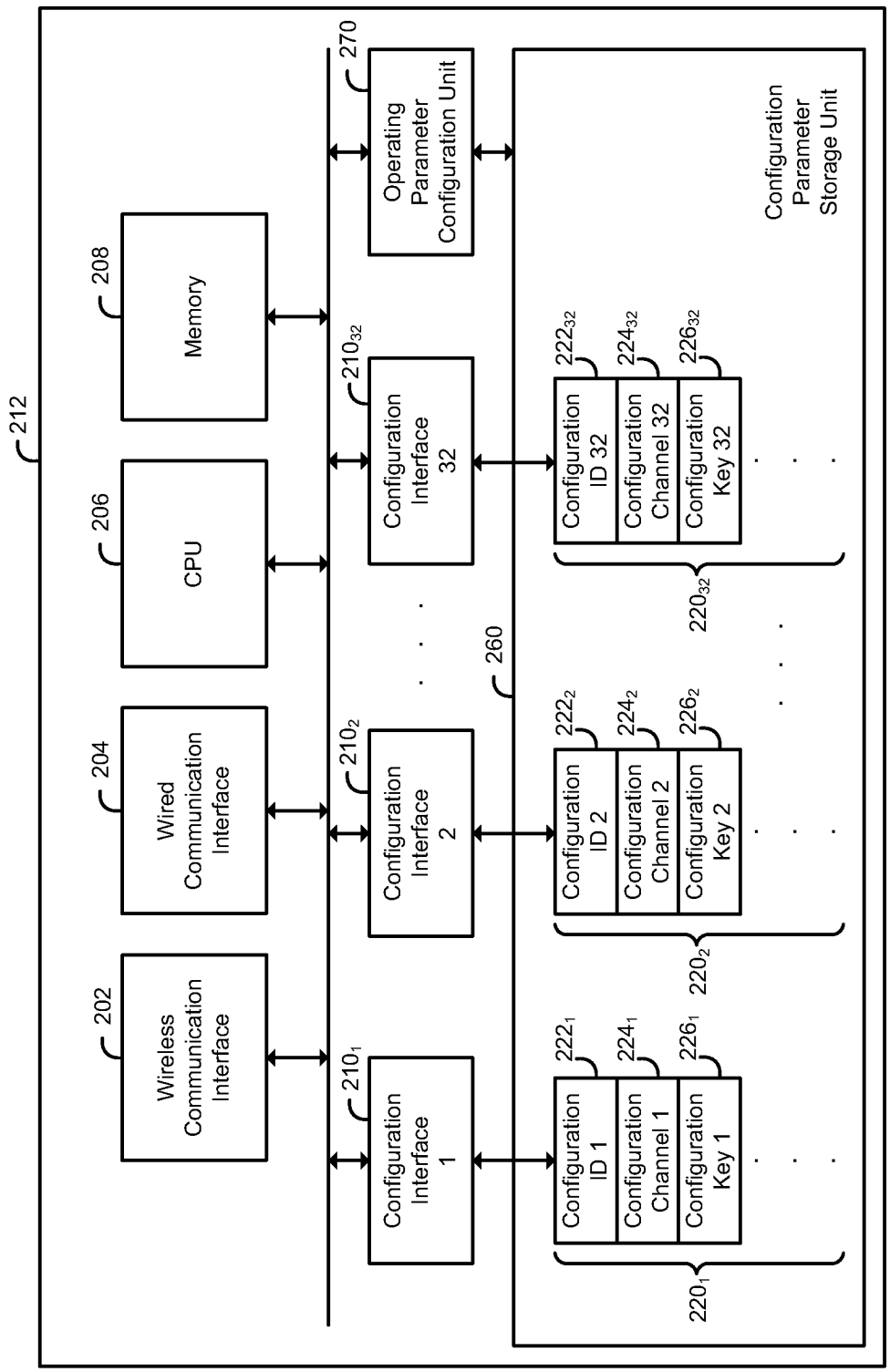
FIG. 2A is a block diagram illustrating the architecture of an example handset configuration station that includes dynamic configuration capabilities.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Overview of an Example Audience Response System

FIG. 1 is a block diagram illustrating an example audience response system 100 that may be configured dynamically. For ease of explanation, various components of the example audience response system 100 (and similar systems) will be described in the context of a classroom environment, where a teacher 216 may interact with one or more students 108 using the audience response system 100. However, it will be understood by one of ordinary skill in the art that the example audience response system 100, as well as individual components thereof, may be used in other settings (e.g., corporate training, focus groups, and so on).

The example audience response system 100 includes multiple handsets 114 that may be used by students 108 to answer questions (e.g., posed by a teacher 216), vote on a topic, confirm attendance, and so on. Generally, the handsets 114 may be configured to receive user input data (such as answers to a multiple-choice questions) from students 108 and to communicate the user input data wirelessly (e.g., using radio frequency (RF) or infrared (IR) communication technology) to one or more wireless aggregation points 102. A wireless aggregation point 102 may be coupled to a control station 106, and the control station 106, the wireless aggregation point 102, or a combination thereof may be used to process the user input data.

The term "wireless aggregation point" is used here broadly to denote any device (or a combination of devices) that is capable of sending information to and/or receiving information from multiple handsets (thus making the multiple handsets capable of operating simultaneously, or substantially simultaneously). Examples of a wireless aggregation point include base stations, RF USB/Serial dongles, IR USB/Serial dongles, wireless access points (as per IEEE 802.11, IEEE 802.16, or other wireless communication protocols and standard), etc.

The term "control station" is also used here broadly to denote any device (or a combination of devices) that is capable of processing data received from the handsets 114. In the example audience response system 100 illustrated in FIG. 1, the control station 106 implements a handset configuration program 148 that partially controls the configuration of the handsets 114, as will be explained below in more detail. However, it will be understood, that the handset configuration program 148 may be distributed among the control station 106 and the wireless access point 102, among multiple control stations 106 and/or multiple wireless access points 102, and among other devices that are shown, or not shown in FIG. 1.

Much of the functionality of the handset configuration program 148 may be implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Example Dynamic Configuration of the Example Audience Response System

In order for the audience response system 100 to function properly and effectively, the handsets 114 typically need to be configured, and sometimes reconfigured dynamically, to operate together in an efficient manner, and without interfering with one another. Generally, configuring a handset 114 involves defining one or more operating parameters associated with the handset 114. Operating parameters associated with a given handset 114 may include, a unique (or a quasi-unique) handset identifier (ID) that identifies that handset 114, one or more parameters defining a communication channel (e.g., a particular frequency or a frequency band) that the handset can use to communicate with the wireless aggregation point 102, one or more parameters defining various keys that the handset can use to establish a communication link with the wireless aggregation point 102 (e.g., synchronization keys, an encryption keys, access keys), and so on.

Operating parameters associated with handsets 114 may need to be defined before the handsets 114 can be used in the audience response system 100 so that, for example, no two handsets 114 have the same associated handset ID, or so that no two handsets 114 share a wireless communication channel in a conflicting manner, etc. In some instances, these and other operating parameters may also need to be redefined dynamically, in order to account for user preferences and for changes in the audience response system 100 (such as introduction of new handsets 114, wireless aggregations points 102, encryption keys, etc.), and so on.

The operating parameters associated with the handsets 114 may be defined and redefined dynamically in a variety of ways. In some embodiments, the operating parameters associated with the handsets 114 may be defined dynamically via the wireless aggregation point 102 and without any user interaction with the handset 114 itself. In other words, in these embodiments, the operating parameters associated with the handsets 114 are dynamically configurable via the wireless aggregation point 102 and, in some instances, without any user interaction with the handset 114.

As will be described in more detail below, in some embodiments, the control station 106, the wireless aggregation point 102, or a combination thereof may transmit (e.g., periodically) parameter data indicative of the operating parameters of individual handsets 114. When the handsets 114 receive such data, the handsets 114 may reconfigure themselves (e.g., update their operating parameters) based on this received parameter data. In this fashion, the audience response system 100 effectively monitors, in real time, for potential for potential conflicts in its configuration, and refreshes its configuration to resolve such conflicts should they occur. As a result, the teacher 216 may spend less time manually configuring and reconfiguring the handsets 114 and diagnosing conflicts in the audience response system 100.

Additionally, or alternatively, in some embodiments, in order to define, or redefine, the operating parameters associated with the handsets 114, the audience response system 100 may include a handset configuration station 112, via which the operating parameters of the handsets 114 may be defined. Generally, the handset configuration station 112 includes multiple configuration interfaces 110, and each configuration interface 110 may have one or more associated configuration parameters corresponding to the operating parameters associated with the handsets 114 (e.g., handset ID, frequency, or frequencies, associated with the communication channel, keys for establishing the communication channel, and so on). Handsets 114 can be communicatively coupled to the configurations interfaces 110, and the operating parameters associated with the handsets 114 may be defined via the configuration interfaces 110 based on the configuration parameters associated with the configuration interfaces 110.

In some embodiments, the handset configuration station 112 can be a docking station, where the configurations interfaces 110 are configuration slots into which handsets 114 can be docked (e.g., inserted, or plugged in) to be configured. For example, each configuration slot may have an associated one or more configuration parameters, and when a handset 114 is docked in a particular configuration slot, the operating parameters of the inserted handset 114 may be defined based on the configuration parameters associated with that configuration slot. For example, as illustrated in FIG. 1, the handset configuration station 112 can be a docking station with thirty-two different configuration interfaces, or slots $110_1$-$110_{32}$, and each slot $110_1$-$110_{32}$ may have a unique configuration ID ranging from 1 to 32. When a handset $114_4$ is docked in slot 4 (i.e., the configuration interface $110_4$ that has an associated configuration interface ID of 4), the handset ID of that handset $114_4$ can be defined as, or set to 4.

The phrase "docking station" is used here broadly to indicate that, in addition to the handset configuration features described herein, the handset configuration station 112 can include one or more features that are typically associated with the docking stations that are known in the art. For example, in addition to configuring the handsets 114, the handset configuration station 112 may be used to, house, charge, or to troubleshoot the handsets 114. The handset configuration station 112 can also be used to transfer data between the handsets 114 and the handset configuration station 112, or between the handsets 114 and any device that is communicatively coupled to the handset configuration station 112. In some embodiments, the handsets 114 may be docked and undocked when they are powered on (or "hot"), when they are powered off (or "cold"), and/or when they are in standby mode. Optionally, the configuration station 112 may serve as a port replicator, a breakout dock, a converter dock, etc., for the handsets 114 However, it should be understood that at least some of these features that are typically associated the docking stations that are known in the art are optional and may not be included in some embodiments.

A handset 114 can be communicatively coupled to a configuration interface 110 in a variety of ways. For example, a handset 114 can be communicatively coupled to a configuration interface 110 using suitable serial and/or communications techniques (e.g., via serial and/or parallel ports). If desired, in order to reduce costs, the number of physical links between the handset 114 and the communication interface 110 may be limited. In one embodiment, the RS-232 protocol may be used. Additionally, or alternatively, a single simplex serial connection may be utilized that includes one physical link for power, one physical link for ground and a one physical link for bidirectional serial communication. In some embodiments, the number of physical links may be reduced to two by AC coupling the serial transmission link to the power physical link. In other embodiments, more than three physical links may be used.

In some embodiments, the handset configuration station 112 may use a multiplexer to communicate with each handset 114 individually. For instance, the handset configuration station 112 may periodically poll all of the communication interfaces 110 (or slots) for the presence of handsets 114. If the handset configuration stations 112 detects a presence of a handset 114 communicatively coupled to a particular communication interface 110, the handset configuration station 112 may assign to that handset 114 a unique handset ID as well as the wireless channel that the handset 114 should use for communication with the wireless aggregation point 102. Additionally, or alternatively, if the handset 114 has an incorrect firmware version, the handset configuration station 112 may update the firmware of the handset 112.

There are several advantages to using the configuration station 112, such as a docking station, to configure handsets 114 in an audience response system. For example, multiple handsets 114 may be docket in multiple slots and configured simultaneously, or substantially simultaneously, thus reducing the time a teacher 116 needs to spend on manually configuring the handsets 114. Additionally, in order to reconfigured a handsets 114 (e.g., with a different handset ID), the handset 114 can simply docked in a different slot (with a configuration ID corresponding to the handset ID). Furthermore, configuring the handsets 114 via the configuration station 112 minimizes the human error, as a significant portion of the configuration process is performed automatically.

In some embodiments, the handset configuration station 112 may be communicatively coupled to the control station 106, with the wireless aggregation point 102, or with both. Accordingly, the configuration parameters associated with the configuration interfaces 110, or configuration slots, may be stored in various portions of the audience response system 100 and communicated to a handset 114 when the handset communicatively couples with a communication interface 110. In some embodiments, for instance, the configuration parameters associated with the configuration interfaces 110 may be stored in memory in the handset configuration station 112. Alternatively, the configuration parameters associated with the configuration interfaces 110 may be stored in the control station 106 or in the wireless aggregation point 106. In some instances, data related to the configuration parameters may be distributed throughout various entities within the audience response system 100.

In various embodiments, the configuration parameters associated with the configuration interfaces 110 may be defined via any combination of entities within the audience response system 100. For example, the handset configuration station 112 may have a user interface (not shown), and the configuration parameters associated with the configuration interfaces 110 of the handset configuration station 112 may be defined via that interface. Additionally, or alternatively, the configuration parameters may be defined remotely via the control station 106, the wireless aggregation point 102, a combination thereof, and/or via other entities within the audience response system 100.

Similarly, various combinations of entities within the audience response system 100 may be used to define the operating parameters of the handsets 114, including the handsets 114 themselves. For example, in some embodiments, when a handset 114 is communicatively coupled to a configuration interface 110 of the handset configuration station 112, the handset 114 may define its own operating parameters, e.g., by reading the configuration parameters associated with that configuration interfaces 110 from memory within the handset configuration station 112. In these embodiments, the handset configuration station 112 may play a relatively passive role in defining the operating parameters of the handset 114. In other embodiments, when a handset 114 is communicatively coupled to a configuration interface 110 of the handset configuration station 112, the handset configuration station 112 may play a more active role in defining the operating parameters of the handset 114, e.g., by writing data indicative of the operating parameters into the memory of the handset 114. Additionally, or alternatively, as explained above, the control station 106 and/or the wireless aggregation point 102 may define the operating parameters of a handset 114 by transmitting (e.g., periodically) parameter data indicative of the operating parameters of that handset 114, and that handset 114 may reconfigure itself (e.g., update its operating parameters) based on this received parameter data.

It will be understood by one of ordinary skill in the art that the handset configuration station 112, the wireless aggregation point 102 and the control station 106 may be communicatively coupled in a variety of ways. For example, if the wireless aggregation point 102 is an RF USB/Serial dongle, the wireless aggregation point 102 may be coupled directly to the control station 106, e.g., via a USB port or a serial port. The handset configuration station 112 may be coupled directly to the control station 106 in a similar manner. However, in some embodiments, the handset configuration station 112, the wireless aggregation point 102 and the control station 106 may be communicatively coupled via intermediary devices, such as hubs, firewalls, proxies, bridges, switches, etc. For instance, the handset configuration station 112, the wireless aggregation point 102 and the control station 106 may be coupled via a computer network, such as the Internet, a local area network (LAN), a virtual private network (VPN), or any other network that allows one or more computers, communication devices, databases, etc., to be communicatively coupled to each other.

It will be further understood by one of ordinary skill in the art that, although for ease of explanation, the handset configuration station 112, the wireless aggregation point 102 and the control station 106 are illustrated as three separate entities in FIG. 1, more or fewer entities may be used. For example, in some embodiments, the wireless aggregation point 102 may be part of the control station 106 or part of the handset configuration station 112. Likewise, the handset configuration station 112 may be part of the control station 106 or vice versa. In some embodiments, the control station 106 may include more than one computer system, and more than one handset configuration station 112 may be used.

In general, it will be appreciated that the audience response system 100 illustrated in FIG. 1 is just one example of dynamically configurable audience response system, and that it would be obvious to those skilled in the art to make various changes and modifications without departing from the spirit and scope of the present disclosure. For instance, although the audience response system 100 of FIG. 1 includes 32 handsets 114 and a handset configuration station 112 with 32 configuration interfaces 110, any number of handsets 114 (e.g., 24) and configuration interfaces 110 may be used, including, for example, an unequal number of handsets 114 and configuration interfaces 110.

Example Handset Configuration Station

FIG. 2A is a block diagram illustrating the architecture of an example handset configuration station 212 that includes dynamic configuration capabilities. The example handset configuration station 212 may be utilized in the audience response system 100 illustrated in FIG. 1 as the handset configuration station 112. It will be understood, however, that the handset configuration station 212 may be alternatively used in other audience response systems, and the that audience response system 100 illustrated in FIG. 1 may utilize a handset configuration station 112 that has an architecture that that is different from that of the handset configuration station 212 illustrated in FIG. 2A. Furthermore, it will be understood that if the example handset configuration station 212 is utilized in the audience response system 100 of FIG. 1 as the handset configuration station 112, at least some of the features of the configuration station 212 may be implemented by other entities in the audience response system 100 of FIG. 1, such as the control station 106 or the wireless aggregation point 102.

The handset configuration station 212 includes multiple configuration interfaces 210 (e.g., 24 or 32 configuration interfaces). For at least some of the configuration interfaces 210, the handset configuration station 212 may store in memory (e.g., in a configuration parameter storage unit 260) one or more associated configuration parameters 220, such as the configuration parameters discussed in reference to FIG. 1. As explained above, configuration parameters 220 associated with a given configuration interface 210 may be used to define operating parameters of a handset (such as the handsets 114 illustrated in FIG. 1) when the handset is communicatively coupled to that configuration interface 210. In some embodiments, the operating parameters (or a portion thereof) of the handset that is communicatively coupled to a particular configuration interface 210 may be set to the corresponding configuration parameters 220 of that configuration interface 210. For example, if a particular configuration interface $210_2$ has an associated configuration ID $222_2$ of 2, when a given handset is communicatively coupled to that configuration interface 210$_2$, the handset ID of that handset may be set to 2.

The handset configuration station 112 may also include one or more operating parameter configuration units 270 (coupled to the configuration parameter storage unit 260) generally configured to define the operating parameters of a handset when the handset is communicatively coupled to one of the configuration interfaces 210. For example, in some embodiments, the operating parameter configuration unit 270 may be configured to sense (e.g., via an interrupt) that a handset has been coupled to a configuration interface 210 and to subsequently write data indicative of operating parameters into the memory of the handset (e.g., based on the corresponding configuration parameters 220). In other embodiments, the operating parameter configuration unit 270 may provide the coupled handset with access to the configuration parameters 220 in the configuration parameter storage unit 260 and enable the coupled handset to define its own operating parameters by reading the configuration parameters 220. In some embodiments, the operating parameter configuration unit 270 may retrieve the appropriate configuration parameters from an external source (e.g., a control station or a wireless aggregation point) and either write data indicative of operating parameters into the memory of the handset (based on the retrieved configuration parameters), or provide the coupled handset with the retrieved configuration parameters and enable the coupled handset to define its own operating parameters based on the retrieved configuration parameters.

In addition to the operating parameter configuration unit 270, the configuration interfaces 210 and the associated configuration parameters 220 within the configuration parameter storage unit 260, the handset configuration station 212 may include a number of other units, or components. For example, the handset configuration station 212 may include one or more communication interfaces (e.g., a wireless communication interface 202 and a wired communication interface 204) for generally communicating with, for example, wireless aggregation points and control stations (such as the control station 106 and the wireless aggregation point 102). The handset configuration station 212 may also include a central processing unit (CPU) 206 configured to execute computer readable instructions stored in a memory 208 coupled to the CPU 206 in order to implement at least some of the functions of the handset configuration station 212 described above.

It should be understood that the handset configuration station 212, in some embodiments, or in some modes of operation, may not include one or more of the units 202-270 described above or, alternatively, may not use each of the units 202-270 to configure a handset that is communicatively coupled to the handset configuration station 212. Likewise, if desired, some of the units 202-270 may be combined, or divided into distinct units. In some embodiments, for example, the handset configuration station 212 need not store configuration parameters 220 in the parameter storage unit 260 or even have the parameter storage unit 260 at all. For instance, when the operating parameter configuration unit 270 senses that a handset has been communicatively coupled to a configuration interface 210, the operating parameter configuration unit 270 may notify the control station and/or the wireless aggregation point that the coupled handset needs to be configured. In response, the control station and/or the wireless aggregation point may transmit data indicative of the operating parameters of the handset to the handset configuration station 212 or to the handset itself.

FIG. 2B is a flowchart illustrating an example method 200 for configuring an audience response system (such as the audience response system 100 of FIG. 1) using a handset configuration station, such as the handset configuration station 212. For ease of explanation, FIG. 2B will be explained in reference to FIGS. 1-2A. However, it will be understood that the example method 200 for configuring an audience response system can be utilized with systems and devices other than those shown in FIGS. 1-2A.

If the audience response system includes two or more handsets (e.g., a first handset and a second handset) that are communicatively coupled to a wireless aggregation point, the handset configuration station may be used to determine whether the first handset has been communicatively coupled to the first configuration interface (block 291). If the first handset has been communicatively coupled to the first configuration interface ("YES" branch of block 292), the handset configuration station may be used to define the operational parameters of the of the first handset (such as the operational parameters described above in reference to FIG. 1) via the first configuration interface (block 293).

The handset configuration station may also be used to determine whether the second handset has been communicatively coupled to the second configuration interface (block 294). If the second handset has been communicatively coupled to the second configuration interface ("YES" branch of block 295), the handset configuration station may be used to define the operational parameters of the of the second handset via the second configuration interface (block 296).

As explained above, the handset configuration station may be used to define the operational parameters of the of the first handset and/or the first handset in a variety of ways. For example, the handset configuration station may be used to write data indicative of the first configuration parameter into the first handset (block 293a) and/or to write data indicative of the second configuration parameter into the second handset (block 293b). Additionally, or alternatively, the handset configuration station may be used to provide the first handset with access to the data indicative of the first configuration parameter (block 296a) and/or to provide the second handset with access to the data indicative of the second configuration parameter (block 296b).

Example Architecture of a Dynamically Configurable Handsets

Figure 3A:
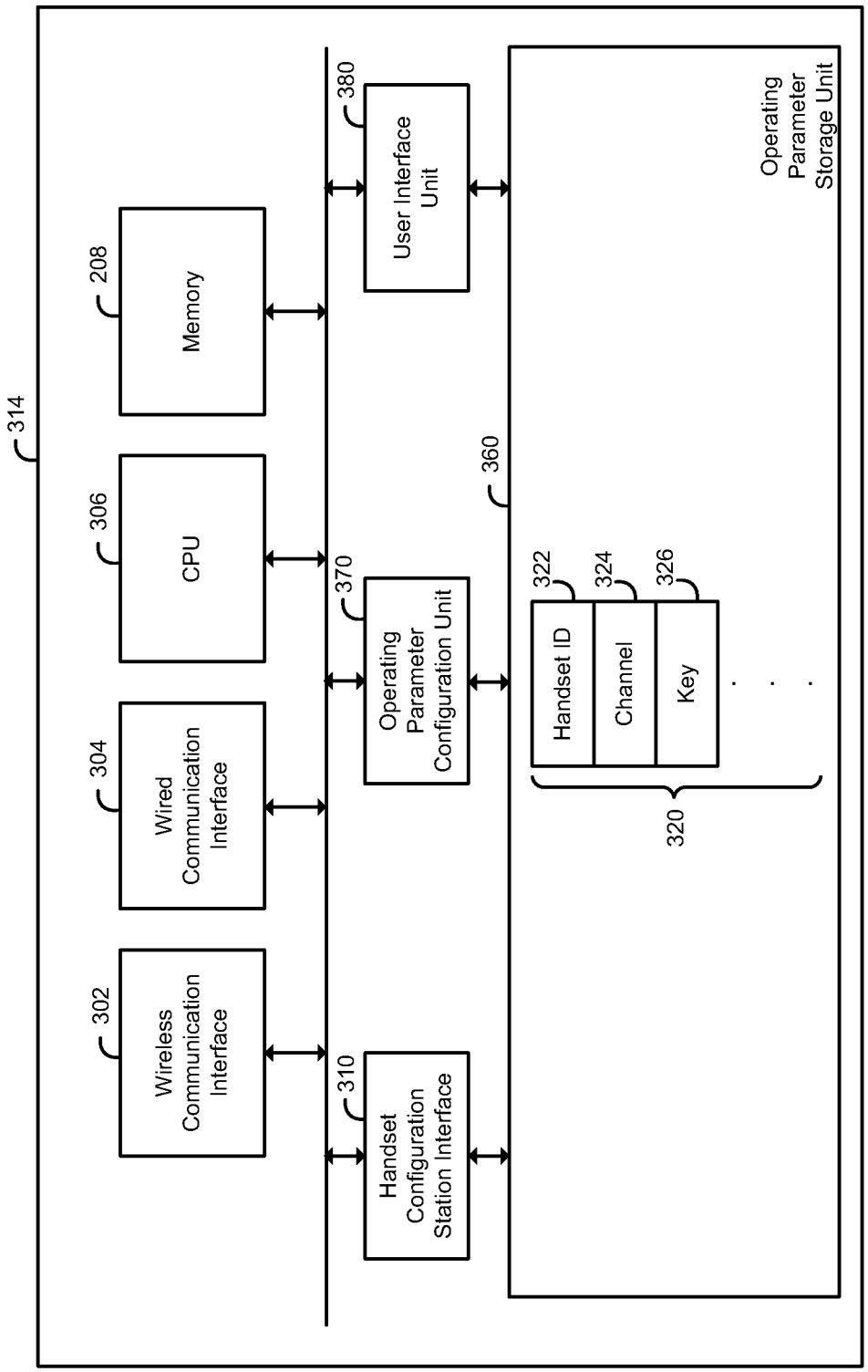
FIG. 3A is a block diagram illustrating an example architecture of a dynamically configurable handset.

FIG. 3A is a block diagram illustrating the architecture of an example dynamically configurable handset 314. The example handset 314 may be utilized in the audience response system 100 illustrated in FIG. 1 as a handset 114. It will be understood, however, that the handset 314 may be alternatively used in other audience response systems, and that audience response system 100 illustrated in FIG. 1 may utilize a handset 114 that has an architecture that is different from that of the handset 314 illustrated in FIG. 3.

The handset 314 includes an operating parameter storage unit 360 that stores data indicative of one or more operating parameters 320 of the handset 314, such as the operating parameters discussed in reference to FIG. 1 (e.g., handset ID 322, parameters 324 defining a communication channel that the handset 314 can use to communicate with a wireless aggregation point, one or more parameters 326 defining various keys that the handset 314 can use to establish a communication link with the wireless aggregation point, and so on). Additionally, the handset 314 includes an operating parameter configuration unit 370 that is generally configured to define the operating parameters 320 stored in the operating parameter storage unit 360.

The operating parameter configuration unit 370 may be used to define the operating parameters 320 of the handset 314 in a variety of ways. As explained in reference to FIG. 2A, for example, in some embodiments, the handset 314 may communicatively couple, via the handset configuration station interface 310, to a handset configuration station (such as the handset configuration station 212 illustrated in FIG. 2A) and the handset configuration station may provide the handset 314 with data indicative of the operating parameters 320 of the handset 314.

In some embodiments, the operating parameter configuration unit 370 may receive data indicative of the operating parameters 320 from a remote source (e.g., a control station via a wireless aggregation point) and update the values of its operating parameters 320 in response to, or based on, the received data. For example, if the operating parameter configuration unit 370 of the remote handset 314 receives data indicative of a value of a particular operating parameter 320 of the remote handset 314, and the value of that operating parameter 320 that is stored in the operating parameter storage unit 360 is not the same as the received value, the operating parameter configuration unit 370 may set the stored value of the operating parameter 320 in the operating parameter storage unit 360 to the received value. That is, for instance, if the operating parameter storage unit 360 of the handset 314 stores 12 as the value of its handset ID 322, and the operating parameter configuration unit 370 receives data that indicates that the value of its handset ID 322 should be 15, the operating parameter configuration unit 370 may set the value of the handset ID in the operating parameter storage unit 360 of the handset 314 to 15.

In some instances, instead of, or in addition to, receiving data indicative of one or more of its own operating parameters 320, the handset 314 may receive data indicative of an operating parameter, or operating parameters, of another ("peer") handset in the audience response system. In fact, in some instances, the handset 314 may receive data indicative of the operating parameters of all other handsets in the audience response system. That is, the control station, for instance, may broadcast, at predetermined time intervals (e.g., periodically) the operating parameters of all handsets in the audience response systems, and each handset (such as the handset 314) may therefore identify potential conflicts it may have with other handsets and dynamically reconfigure itself in order to resolve such conflicts.

For example, if an operating parameter configuration unit 370 of a handset 314 receives data indicative of a handset ID of another handset ID, and the other handset ID is the same as the handset ID 322 stored in the operating parameter storage unit 360 of the handset 314, there may be a conflict in the system. To resolve this conflict, the operating parameter configuration unit 370 of the handset 314 may set the stored handset ID 322 to some value that is different from the received handset ID value. Therefore, referring again to FIG. 1, in the event that two different handsets 114 are plugged into the same slot 110 of the handset configuration station 112 (one at a time), and the two different handsets 114 are assigned the same handset ID as a result, one of the handsets 114, upon receiving, via the wireless aggregation point 102, data that indicates that another remote set has the same handset ID, will reconfigure itself with a different handset ID.

In addition to the operating parameter configuration unit 370, the operating parameter storage unit 360 and the handset configuration station interface 310, the handset 314 may include a number of other units, or components. For example, the handset 314 may include one or more communication interfaces (e.g., a wireless communication interface 302 and a wired communication interface 304) for generally communicating with, for example, wireless aggregation points and control stations. The handset 314 may also include a central processing unit (CPU) 306 configured to execute computer readable instructions stored in a memory 308 coupled to the CPU 306 in order to implement at least some of the functions of the handset 314 described above.

Additionally, the handset 314 may include a user interface unit 380 that will be described below. Generally, the user interface unit 380 provides a user interface for the handset 314 to enable a student to interact with the handset 314. For example, the user interface unit 380 is configured to receive user input from a student and to communicate data indicative of the user input to the wireless aggregation point, such as the wireless aggregation point 102 of FIG. 1.

Figure 3B:
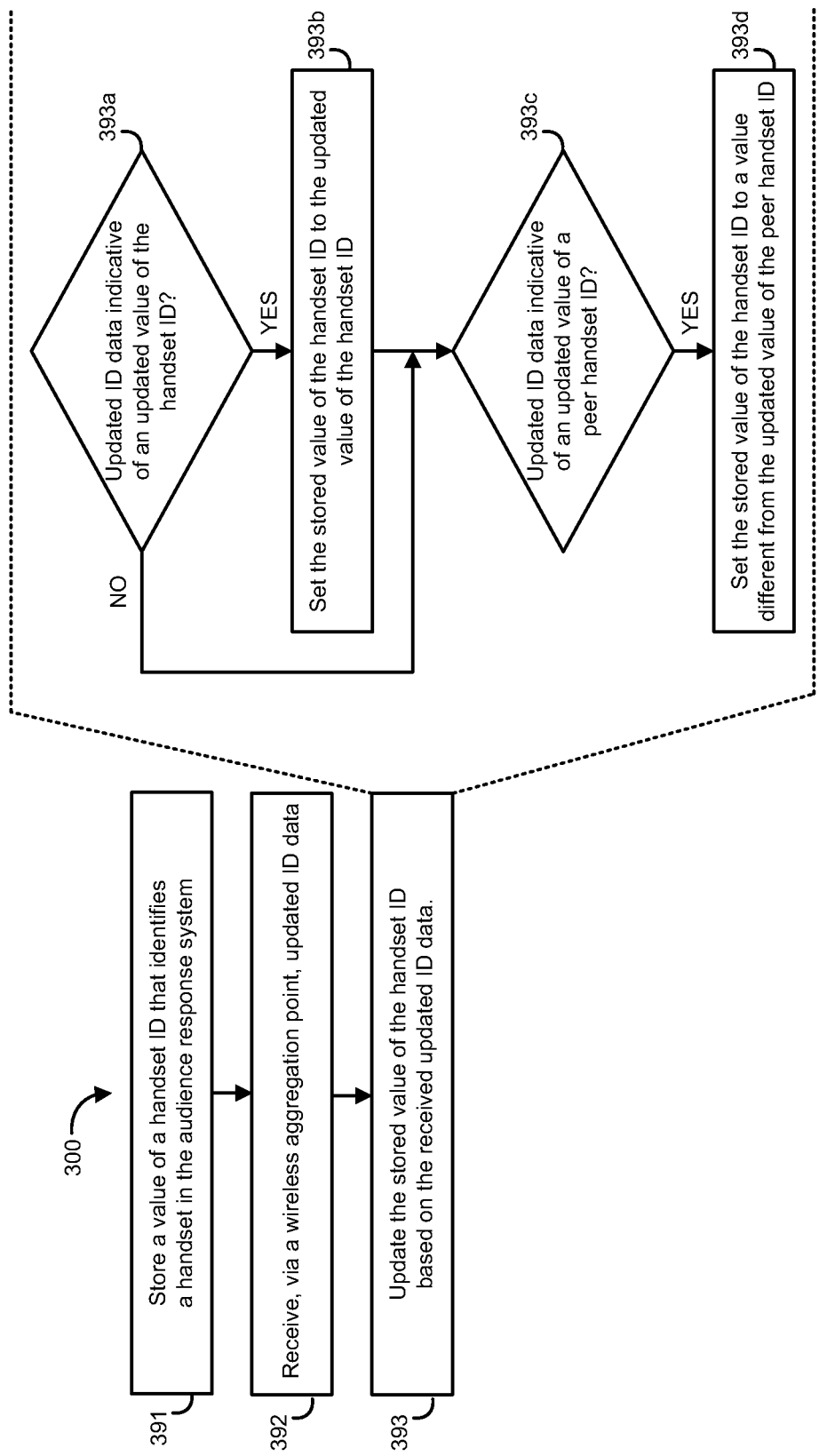
FIG. 3B is a flowchart illustrating an example method for configuring a handset.

FIG. 3B is a flowchart illustrating an example method 300 for configuring handset, such as one of the handsets 114 illustrated in FIG. 1 and/or the handset 314, the architecture of which is illustrated in FIG. 3A. For ease of explanation, FIG. 3B will be explained in reference to FIGS. 1-3A. However, it will be understood that the example method 300 for configuring a handset can be utilized with systems and devices other than those shown in FIGS. 1-3A.

If the audience response system includes two or more handsets that are communicatively coupled to a wireless aggregation point, a given handset can store a value of a handset ID that identifies that handset in the audience response system (block 391). The handset may receive, via the wireless aggregation point (e.g., periodically, or more generally, at some predetermined times of time intervals), updated ID data (block 392). Once the update ID data is received, the handset may update the stored value of the handset ID based on the received updated ID data (block 393).

As explained above, the updated ID data may include various types of data. For example, the updated ID data may be indicative of an updated value of the handset ID. Additionally, or alternatively, the updated ID data may be indicative of an updated value of a peer handset ID that identifies another handset in the audience response system. If the updated ID data is indicative of an updated value of the handset ID ("YES" branch of block 393a), the handset may set the stored value of the handset ID to the updated value of the handset ID (block 393b). If the updated ID data is indicative of an updated value of a peer handset ID that identifies another handset in the audience response system ("YES" branch of block 393c), the handset may set the stored value of the handset ID to a value different from the updated value of the peer handset ID (block 393d).

Before discussing further details of the user interface, it should be understood that the handset 314, in some embodiments, or in some modes of operation, may not include one or more of the units 302-370 described above or, alternatively, may not use each of the units 302-370 to configure itself. Likewise, if desired, some of the units 302-370 may be combined, or divided into distinct units.

Example User Interface of a Dynamically Configurable Handsets

Figure 4A:
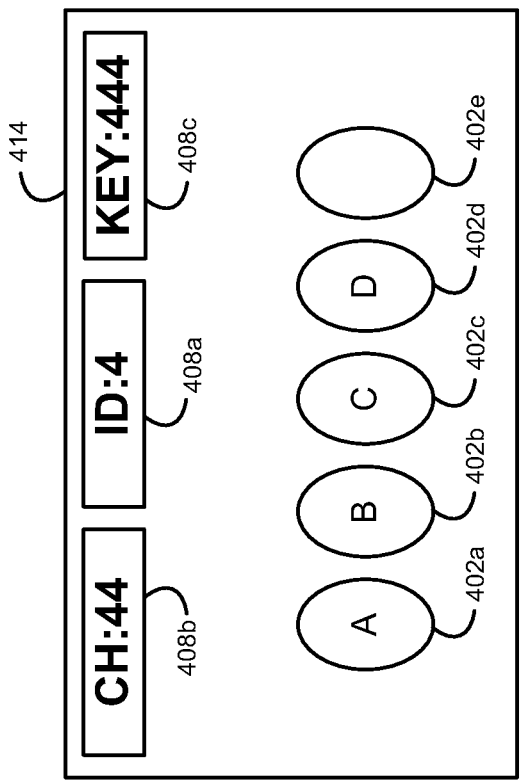
FIG. 4A illustrates an example user interfaces that may be included with a handset.

FIG. 4A illustrates an example user interfaces 414 that may be included with handsets 114 of the audience response system 100 illustrated in FIG. 1. As illustrated in FIG. 4A, a user interface 414 of a handset may include multiple user input interface elements 402 (e.g., buttons, icons on a touchscreen, and so on) configured to enable a user to answer questions presented in an audience interaction environment such as a classroom. Various types of user input interface elements 402 may be used, such as those discussed in the Provisional Application No. 61/265,140, entitled "DYNAMIC USER INTERFACE FOR USE IN AN AUDIENCE RESPONSE SYSTEM," filed on Nov. 30, 2009, which is herein incorporated by reference in its entirety.

Additionally, the user interface 414 of the handset may also include one or more output interface elements 408 configured to provide an electronic indication of one or more operating parameters of the handset that are configurable dynamically via a wireless aggregation point and, in some instances, without any user interaction with the handset itself. For example, the user interface 414 of the handset may include an output interface element 408*a* configured to provide an electronic indication of the handset ID, an output interface element 408*b* configured to provide an electronic indication of the communication channel (e.g., a particular frequency or a frequency band) that the handset can use to communicate with the wireless aggregation point, one or more output interface elements 408*c* configured to provide an electronic indication of various keys that the handset can use to establish a communication link with the wireless aggregation point (e.g., synchronization keys, an encryption keys, access keys), and so on. The user interface 414 may includes numerous other interface elements and/or be configured to perform additional functions, such as those discussed in the Provisional Application No. 61/265,140, entitled "DYNAMIC USER INTERFACE FOR USE IN AN AUDIENCE RESPONSE SYSTEM," filed on Nov. 30, 2009.

Various different types of output interface elements 408 may be used to provide an electronic indication of one or more operating parameters of the handset. For example, output interface elements 408 may electronic displays configured to electronically display one or more operating parameters of the handset. Examples of suitable electronic displays include, but are not limited to, bi-stable displays, a liquid crystal displays (LCD) and a light emitting diode (LED) displays. The one or more operating parameters of the handset may be displayed in a variety of forms. For example, a handset ID may represented and displayed as a decimal number. The one or more operating parameters of the handset may also be displayed at various times, depending, for example, on user preferences. For instance, the one or more operating parameters of the handset may be displayed only upon request, or at predetermined times or time intervals (e.g., regular time intervals), etc.

Figure 4B:
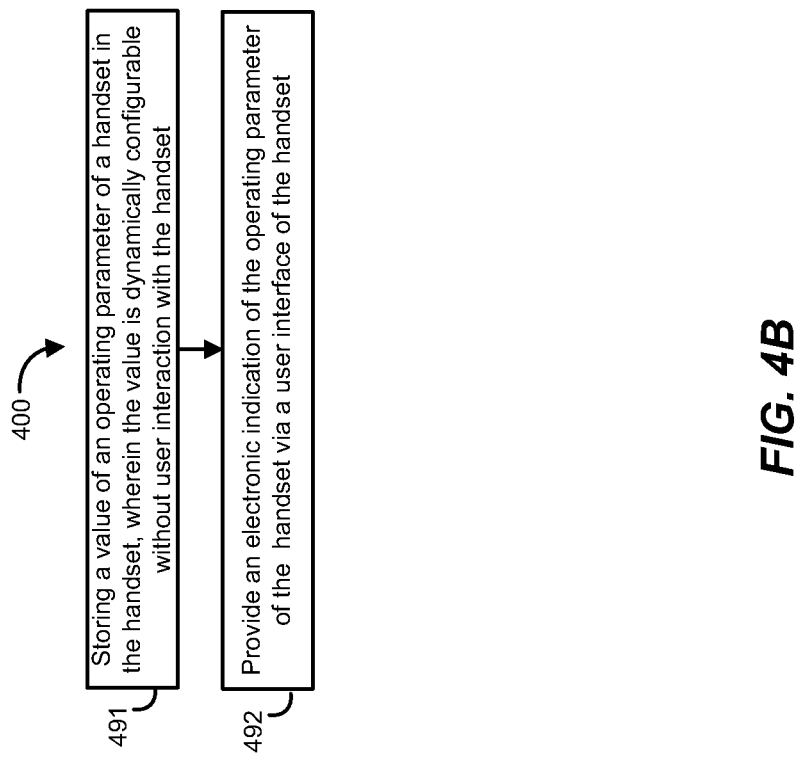
FIG. 4B is a flowchart illustrating an example method for configuring a user interface of a handset.

FIG. 4B is a flowchart illustrating an example method 400 for configuring a user interface of handset (such as the user interface 414 illustrated in FIG. 4A) in an audience response system that includes multiple handsets communicatively coupled via a wireless aggregation point. For ease of explanation, FIG. 4B will be explained in reference to FIGS. 1-4A. However, it will be understood that the example method 400 for configuring a user interface of handset can be utilized with systems and devices other than those shown in FIGS. 1-4A.

If the audience response system includes two or more handsets that are communicatively coupled to a wireless aggregation point, a given handset can store a value of an operating parameter of a handset (such as one of the operating parameters discussed above) in the handset (e.g., in memory). In some embodiments, the value of the operating parameter of the handset is dynamically configurable without user interaction with that handset (block 491). An electronic indication of the operating parameter of the handset may be provided via the user interface of the handset (block 492).

As explained above, the electronic indication of the operating parameter of the handset may be provided via an electronic display. The electronic display may display a decimal number indicative of the operating parameter of the handset. The electronic display may be a bi-stable display, a liquid crystal display and a light emitting diode (LED) display, etc.

In some embodiments, the electronic indication of the operating parameter of the handset may be provided only upon request. In some embodiments, he electronic indication of the operating parameter of the handset may be provided at predetermined times (e.g., at regular intervals).

Example Control Station

Figure 5:
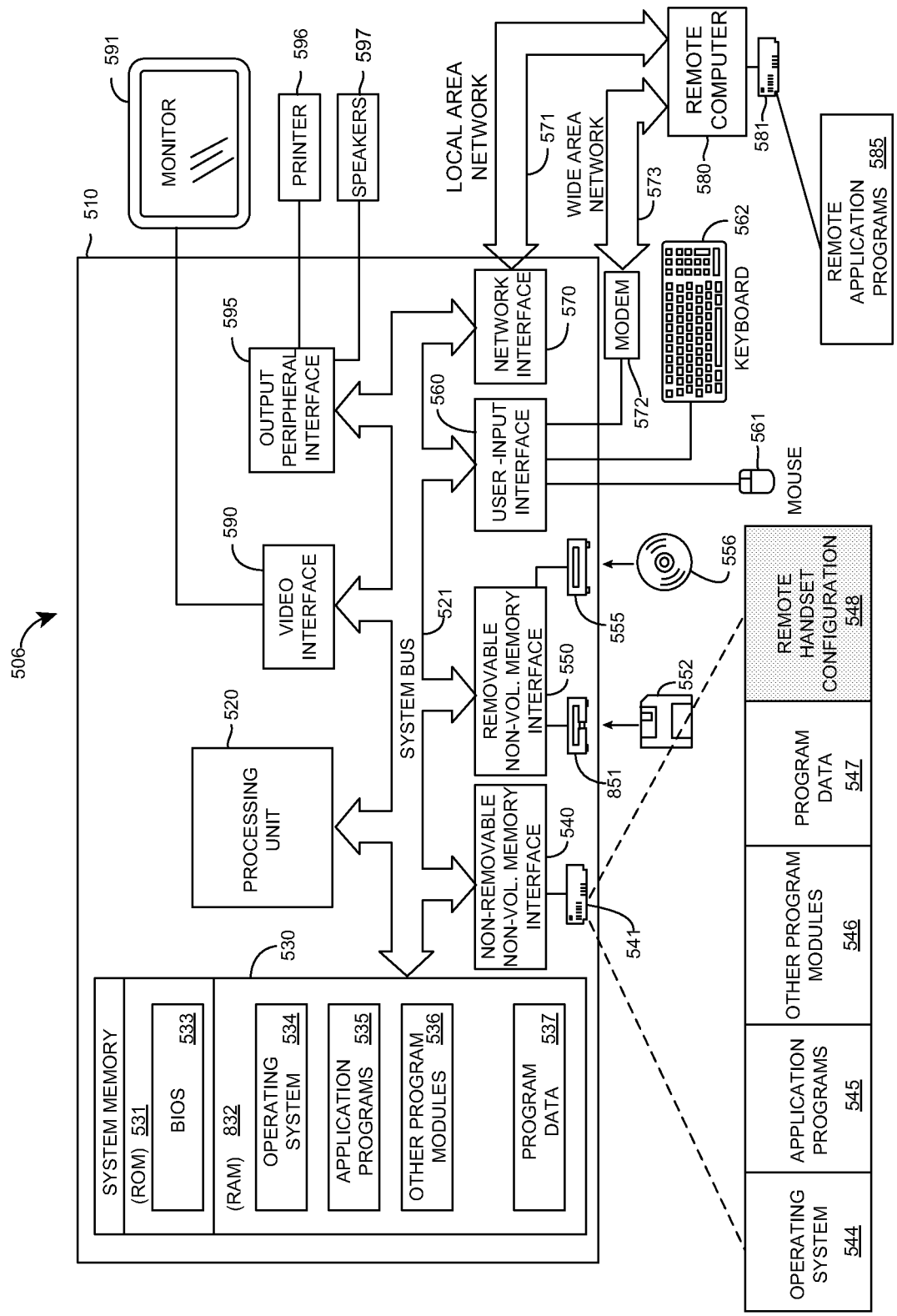
FIG. 5 is a block diagram illustrating an example architecture of a control station.

FIG. 5 is a block diagram of an example architecture of a control station 506. The example control station 506 may be utilized in the audience response system 100 illustrated in FIG. 1 as a control station 106. It will be understood, however, that the control station 506 may be alternatively used in other audience response systems, and the that audience response system 100 illustrated in FIG. 1 may utilize a control station 106 that has an architecture that that is different from that of the control station 506 illustrated in FIG. 5.

Components of the control station 506 may include, but are not limited to a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Control station 506 typically includes a variety of computer readable media. Computer readable media can be any available media that can be accessed by control station 506 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by control station 506. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within control station 506, such as during start-up, is typically stored in ROM 531. RAM 532 typically contains data and/or program modules that are immediately accessible to and/or presently being operated on by processing unit 520. By way of example, and not limitation, FIG. 5 illustrates operating system 544, application programs 545, other program modules 546, program data 537, and a handset configuration program 548. It should be noted, however, that at least some of the program modules 544-548, such as the handset configuration program 548 may implemented, at least partially, by entities in an audience response system other than the control station 506. For example, the handset configuration program 548 may be distributed among the control station 506, and the wireless access point, among multiple control stations 506 and/or multiple wireless access points, and among other devices within an audience response system.

The control station 506 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the control station 506. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 20 through input devices such as a keyboard 562 and cursor control device 561, commonly referred to as a mouse, trackball or touch pad. A camera 563, such as web camera (webcam), may capture and input pictures of an environment associated with the control station 506, such as providing pictures of users. The webcam 563 may capture pictures on demand, for example, when instructed by a user, or may take pictures periodically under the control of the control station 506. Other input devices (not shown) may include a microphone, joystick, game pad, satellite dish, scanner, or the like. These and other input devices are often connected to the processing unit 520 through an input interface 560 that is coupled to the system bus, but may be connected by other interface and bus structures, such as a parallel port, game port or a universal serial bus (USB). A monitor 591 or other type of display device is also connected to the system bus 521 via an interface, such as a graphics controller 590. In addition to the monitor, computers may also include other peripheral output devices such as speakers 597 and printer 596, which may be connected through an output peripheral interface 595.

The control station 506 may operate in a networked environment using logical connections to one or more remote computers, such as a remote computer 580. The remote computer 580 may be a personal computer, a server, a router, a network PC, a peer device or other common network node, and typically includes many or all of the elements described above relative to the control station 506, although only a memory storage device 581 has been illustrated in FIG. 2A. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the control station 506 is connected to the LAN 571 through a network interface or adapter 570. When used in a WAN networking environment, the control station 506 typically includes a modem 572 or other means for establishing communications over the WAN 573, such as the Internet. The modem 572, which may be internal or external, may be connected to the system bus 521 via the input interface 560, or other appropriate mechanism. In a networked environment, program modules depicted relative to the control station 506, or portions thereof, may be stored in the remote memory storage device. By way of example, and not limitation, FIG. 5 illustrates remote application programs 585 as residing on memory device 581.

The communications connections 570, 572 allow the device to communicate with other devices. The communications connections 570, 572 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 6:
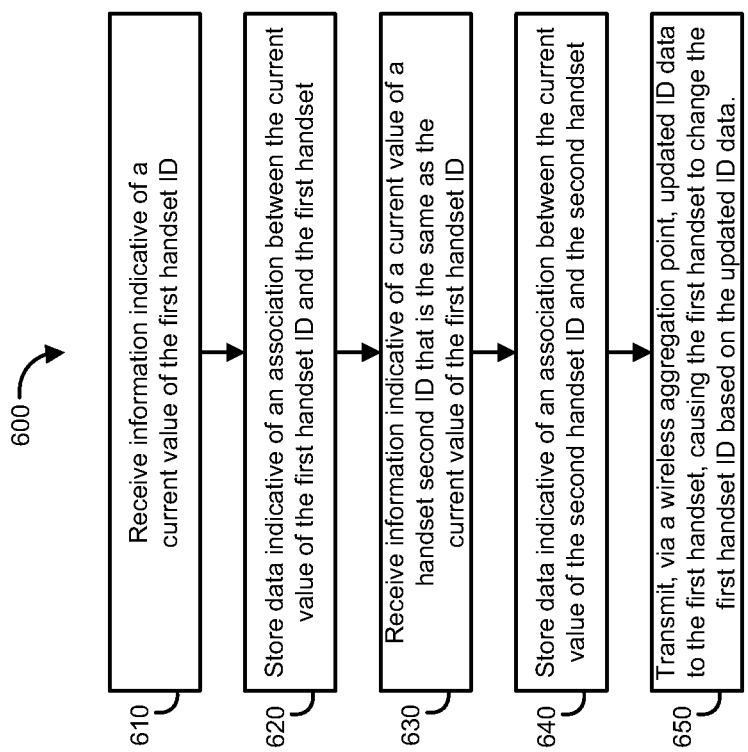
FIG. 6 is a flowchart illustrating an example method that a control station may use for configuring handsets in an audience response system.

FIG. 6 is a flowchart illustrating an example method 600 that a control station (such as the controller station 506 illustrated in FIG. 5) may use for configuring handsets in an audience response system (such as the handsets 114 in the audience response system 100 illustrated in FIG. 1). For ease of explanation, FIG. 6 will be explained in reference to FIGS. 1-5. However, it will be understood that the example method 600 for configuring the handsets in an audience response system can be utilized with systems and devices other than those shown in FIGS. 1-5.

Generally, the control station may use the handset configuration program 548 (or other means) to store, in memory, data indicative of associations between particular handset IDs and particular handsets. For instance, the configuration program 548 may be used to store, e.g., in a table, associations between particular handset IDs and the Media Access Control (MAC) addresses of particular handsets. These associations (or a subset thereof), or data indicative of these associations, may be transmitted to one or more of the handsets (e.g., periodically), and the transmitted associations may cause the respective handsets to change their own handset IDs. As explained above, for example, if a given handset stores therein a handset ID of 5, and an association between the MAC address of the given handset and a handset ID of 6 is transmitted from the control station to the given handset, the transmitted association may cause the given handset to change its handset ID from 5 to 6. Similarly, if a given handset stores therein a handset ID of 8, and an association between the MAC address of a different handset and a handset ID of 8 is transmitted from the control station to the given handset, the transmitted association may cause the given handset to change its handset ID from 8 to a value other than 8.

In some embodiments, if the audience response system includes multiple handsets, e.g., a first handset and a second handset communicatively coupled to a wireless aggregation point, and the first handset stores therein a first handset identifier (ID) associated with the first handset and a second handset stores therein a second (ID) associated with the second handset, the control station may receive information indicative of a current value of the first handset ID (block 610). The control station may consequently store data indicative of an association between the current value of the first handset ID and the first handset (block 620). The control station may then receive information indicative of a current value of the second handset ID, where the current value of the second handset ID is the same as the current value of the first handset ID (block 630). In response, the control station may store data indicative of an association between the current value of the second handset ID and the second handset, effectively overwriting the first handset ID.

It may be desired for the control station to maintain (e.g. storing) historical data indicative of one or more previous associations between particular handset IDs and particular handsets (or the MAC addresses of the particular handsets). Storing historical data indicative of one or more previous associations between particular handset IDs and particular handsets may be helpful in reconfiguring handsets. For example, in the scenario where a first handset is associated with a handset ID of 12, a second handset is subsequently associated with a handset ID of 12, and the second handset is subsequently associated with a handset ID of 13, it may be save computation time, resources, complexity, etc., to revert to the previous association between the first handset and the handset ID of 12 instead of reconfiguring the first handset and associating it with a new handset ID.

Figure 7:
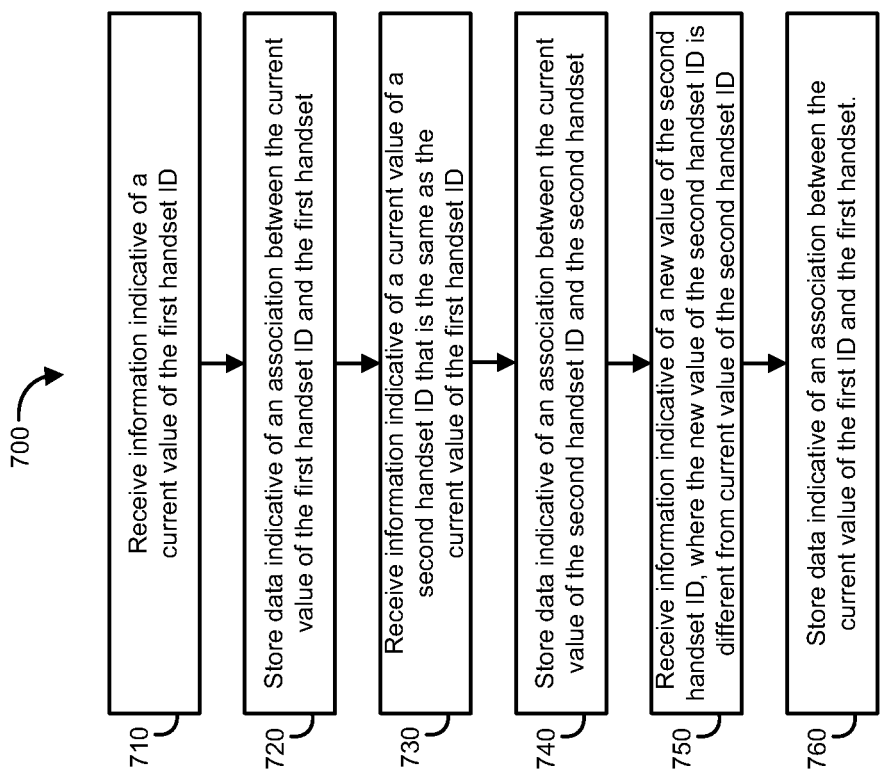
FIG. 7 is a flowchart illustrating an example method that a control station may use for reconfiguring handsets in an audience response system.

FIG. 7 is a flowchart illustrating an example method 700 that a control station (such as the controller station 506 illustrated in FIG. 5) may use for reconfiguring handsets in an audience response system (such as the handsets 114 in the audience response system 100 illustrated in FIG. 1). For ease of explanation, FIG. 7 will be explained in reference to FIGS. 1-5. However, it will be understood that the example method 700 for reconfiguring the handsets in an audience response system can be utilized with systems and devices other than those shown in FIGS. 1-5.

In some embodiments, if the audience response system includes multiple handsets, e.g., a first handset and a second handset communicatively coupled to a wireless aggregation point, and the first handset stores therein a first handset identifier (ID) associated with the first handset and a second handset stores therein a second (ID) associated with the second handset, the control station may receive information indicative of a current value of the first handset ID (block 710) and store data indicative of an association between the current value of the first handset ID and the first handset (block 720). Subsequently, the control station may receive information indicative of a current value of the second handset ID, where the current value of the first handset ID is the same as the current value of the first ID (block 730), and store, in the memory, data indicative of an association between the current value of the second handset ID and the second handset (block 740). Subsequently, the control station may receive information indicative of a new value of the second handset ID, where the new value of the second handset ID is different from current value of the second handset ID (block 750) and store, in the memory, data indicative of an association between the current value of the first handset ID and the first handset (block 760).

Particular embodiments of the dynamically configurable audience response system have been illustrated and described. However, it would be obvious to those skilled in the art that various other changes and modifications can be made without departing from the spirit and scope of the present disclosure. It is therefore intended to cover in the appended claims all such changes and modifications that are within the scope of this invention.

What is claimed:

1. A handset configuration station for use in an audience response system, the audience response system comprising a wireless aggregation point, a first handset and a second handset, the first handset configured to communicatively couple to the wireless aggregation point to receive a first user input from a first user and to communicate the first user input to the wireless aggregation point, the second handset configured to communicatively couple to the wireless aggregation point to receive a second user input from a second user and to communicate the second user input to the wireless aggregation point, the handset configuration station comprising:

a first configuration interface, wherein the first handset is configured to communicatively couple to the first configuration interface to define an operating parameter of the first handset via the first configuration interface; and a second configuration interface, wherein the second handset is configured to communicatively couple to the second configuration interface to define an operating parameter of the second handset via the second configuration interface;

wherein the first handset and the second handset each reconfigure themselves with updated operating parameters based on each wirelessly receiving redefined operating parameters from the wireless aggregation point, the operating parameters for the first handset comprising a first handset identification (ID), a first frequency associated with a first communication channel, and a first key that establishes a communication link with the wireless aggregation point, wherein the first key is a first synchronization key or a first access key, and the operating parameters for the second handset comprising a second handset ID, a second frequency associated with a second communication channel, and a second key that establishes a communication link with the wireless aggregation point, wherein the second key is a second synchronization key or a second access key.

2. The handset configuration station of claim 1, further comprising:
   a configuration parameter storage unit configured to store therein data indicative of a first configuration parameter associated with the first configuration interface and data indicative of a second configuration parameter associated with the second configuration interfaces; and
   an operating parameter configuration unit configured to:
      define the operating parameter of the first handset via the first configuration interface based on the first configuration parameter; and
      define the operating parameter of the second handset via the second configuration interface based on the second configuration parameter.

3. The handset configuration station of claim 2, wherein the operating parameter configuration unit is configured to define the operating parameter of the first handset via the first configuration interface by writing data indicative of the first configuration parameter into the first handset and to define the operating parameter of the second handset via the first configuration interface by writing data indicative of the second configuration parameter into the second handset.

4. The handset configuration station of claim 2, wherein the operating parameter configuration unit is configured to define the operating parameter of the first handset via the first configuration interface by providing the first handset with access to the data indicative of the first configuration parameter and to define the operating parameter of the second handset via the first configuration interface by providing the second handset with access to the data indicative of the second configuration parameter.

5. The handset configuration station of claim 1, wherein the handset configuration station further comprises an operating parameter configuration unit configured to define the operating parameter of the first handset via the first configuration interface by writing data indicative of the first operating parameter into the first handset and to define the operating parameter of the second handset via the first configuration interface by writing data indicative of the second operating parameter into the second handset.

6. The handset configuration station of claim 5, wherein the operating parameter configuration unit is further configured to receive data indicative of the first operating parameter and data indicative of the second operating parameter via the wireless aggregation point.

7. The handset configuration station of claim 1, wherein the operating parameter of the first handset is a first handset identifier (ID) that identifies the first handset, and the operating parameter of the second handset is a second handset ID that identifies the second handset.

8. The handset configuration station of claim 1, wherein the first communication channel is used by the first handset to communicate with the wireless aggregation point, and the second communication channel is used by the second handset to communicate with the wireless aggregation point.

9. The handset configuration station of claim 1, wherein the first key further comprises a first encryption key that is used by the first handset to communicate with the wireless aggregation point, and the second key further comprises a second encryption key that is used by the second handset to communicate with the wireless aggregation point.

10. A method for configuring an audience response system, the audience response system comprising a wireless aggregation point, a handset configuration station including a first configuration interface and a second configuration interface, a first handset and a second handset, the first handset configured to communicatively couple to the wireless aggregation point to receive a first user input from a first user and to communicate the first user input to the wireless aggregation point, the second handset configured to communicatively couple to the wireless aggregation point to receive a second user input from a second user and to communicate the second user input to the wireless aggregation point, the method comprising:
   determining that the first handset has been communicatively coupled to the first configuration interface;
   determining that the second handset has been communicatively coupled to the first configuration interface;
   defining an operating parameter of the first handset via the first configuration interface;
   defining an operating parameter of the second handset via the second configuration interface;
   reconfiguring, by the first handset, by updating operating parameters based on wirelessly receiving from the wireless aggregation point redefined operating parameters for the first handset, the operating parameters for the first handset comprising a first handset identification (ID), a first frequency associated with a first communication channel and a first key that establishes a communication link with the wireless aggregation point, wherein the first key is a first synchronization key or a first access key; and
   reconfiguring, by the second handset, by updating operating parameters based on wirelessly receiving from the wireless aggregation point redefined operating parameters for the second handset, the operating parameters for the second handset comprising a second handset ID, a second frequency associated with a second communication channel and a second key that establishes a communication link with the wireless aggregation point, wherein the second key is a second synchronization key or a second access key.

11. The method of claim 10, wherein:
   the handset configuration station includes a configuration parameter storage unit configured to store therein data indicative of a first configuration parameter associated with the first configuration interface and data indicative of a second configuration parameter associated with the second configuration interface;
   defining the operating parameter of the first handset via the first configuration interface comprises defining the operating parameter of the first handset via the first configuration interface based on the first configuration parameter; and
   defining the operating parameter of the second handset via the second configuration interface comprises defining the operating parameter of the second handset via the second configuration interface based on the second configuration parameter.

12. The method of claim 11, wherein:
   defining the operating parameter of the first handset via the first configuration interface comprises writing data indicative of the first configuration parameter into the first handset; and
   defining the operating parameter of the second handset via the second configuration interface comprises writing data indicative of the second configuration parameter into the second handset.

13. The method of claim 11, wherein:
defining the operating parameter of the first handset via the first configuration interface comprises providing the first handset with access to the data indicative of the first configuration parameter; and
defining the operating parameter of the second handset via the second configuration interface comprises providing the second handset with access to the data indicative of the second configuration parameter.

14. An audience response system comprising:
a wireless aggregation point;
a first handset; and
a second handset,
wherein the first handset comprises:
   a user interface configured to receive user input and to communicate data indicative of the user input to the wireless aggregation point; and
   an operating parameter storage unit configured to store a value of a first handset identifier (ID) that identifies the first handset;
   an operating parameter configuration unit configured to:
   receive, via the wireless aggregation point, updated ID data, the updated ID data indicative of at least one of an updated first handset ID value and an updated value of the second handset ID that identifies the second handset; and
   update that value of the first handset ID stored in the operating parameter storage unit based on the received updated ID data;
wherein the first handset and the second handset are each configured to reconfigure themselves based on each wirelessly receiving updated operating parameters from the wireless aggregation point, the redefined operating parameters for the first handset comprising the updated first handset ID, a first frequency associated with a first communication channel, and a first key that establishes a communication link with the wireless aggregation point, wherein the first key is a first synchronization key or a first access key, and the operating parameters for the second handset comprising the updated second handset ID, a second frequency associated with a second communication channel and a second key that establishes a communication link with the wireless aggregation point, wherein the second key is a second synchronization key or a second access key.

15. The audience response system of claim 14, wherein the operating parameter configuration unit is configured to update the value of the first handset ID stored in the operating parameter storage unit by setting the value of the first handset ID stored in the operating parameter storage unit to the updated value of the first handset ID.

16. The audience response system of claim 14, wherein the operating parameter configuration unit is configured to update the value of the first handset ID stored in the operating parameter storage unit by setting the value of the first handset ID stored in the operating parameter storage unit to a value other than the updated value of the second handset ID.

17. The audience response system of claim 14, wherein the operating parameter configuration unit is configured to receive, via the wireless aggregation point, updated ID data at predetermined time intervals.

\* \* \* \* \*